United States Patent [19]
Newcomer et al.

[11] Patent Number: 5,188,318
[45] Date of Patent: Feb. 23, 1993

[54] STUD ENGAGING ELECTRICAL WIRING CLIP

[76] Inventors: Charles H. Newcomer; Alan K. Galedrige; Richard N. Saylor, all of P.O. Box 134, Grants Pass, Oreg. 97526

[21] Appl. No.: 745,173

[22] Filed: Aug. 15, 1991

Related U.S. Application Data

[63] Continuation-in-part of Ser. No. 722,245, Jun. 27, 1991, and Ser. No. 739,395, Aug. 1, 1991, and Ser. No. 739,394, Aug. 1, 1991, and Ser. No. 739,392, Aug. 1, 1991.

[51] Int. Cl.$^5$ ................................................ F16L 3/22
[52] U.S. Cl. ..................... 248/68.1; 24/335; 174/48
[58] Field of Search ............... 248/68.1, 69, 73, 74.2, 248/906, 231.8, 229; 24/335, 338; 174/48, 168, 338

[56] References Cited

U.S. PATENT DOCUMENTS

| | | |
|---|---|---|
| 2,332,855 | 10/1943 | Jones . |
| 3,226,468 | 12/1965 | Patton et al. . |
| 3,536,281 | 10/1970 | Meehan et al. . |
| 3,537,698 | 11/1970 | Callanan . |
| 3,588,019 | 6/1971 | Cozeck . |
| 3,720,395 | 3/1973 | Schuplin . |
| 4,062,470 | 12/1977 | Boteler . |
| 4,114,241 | 9/1978 | Bisping . |
| 4,140,293 | 2/1979 | Hansen . |
| 4,163,501 | 8/1979 | Lass . |
| 4,447,030 | 5/1984 | Nattel . |
| 4,671,537 | 6/1987 | Yoshitsugu . |
| 4,747,506 | 5/1988 | Stuchlik, III . |
| 4,864,697 | 9/1989 | Sparks et al. ............ 248/68.1 X |
| 4,903,929 | 2/1990 | Hoffman ................... 24/335 X |
| 4,971,280 | 11/1990 | Rinderer ............... 248/231.8 X |
| 5,067,677 | 11/1991 | Miceli ..................... 248/68.1 |
| 5,090,645 | 2/1992 | Zuercher ................ 248/68.1 |

FOREIGN PATENT DOCUMENTS 2439350 5/1980 France ................ 248/74.2

Primary Examiner—Ramon O. Ramirez
Attorney, Agent, or Firm—Jerry T. Kearns

[57] ABSTRACT

A substantially U-shaped stud engaging clip formed from a resilient plastic or metal material and dimensioned for frictional engagement with a standard 2"×4" or 2"×6" framing stud. A wire engaging clip body is formed on a side wall of the stud engaging clip and includes a plurality of resilient clips which may be selectively dimensioned to secure flat ROMEX type cables, round cables, or individual wires. Preferably, each wire engaging clip body includes a variety of differently dimensioned individual clip elements to allow convenient securement of various different conventional forms of wiring. The stud engaging clip may be stapled to the conventional 2"×4" or 2"×6" stud by a conventional manual or rechargeable staple gun to enhance securement. After the wiring is installed utilizing a plurality of the stud engaging clips, drywall is conventionally nailed to the studs, over the clips. According to a second embodiment of the invention, the stud engaging clip may include a resilient clip member dimensioned for cooperation with a plurality of separate wiring system attachments. The wiring system attachments include a variety of different wire engaging clip members for use with various different conventional wire forms and a variety of different electrical boxes. According to other embodiments of the invention, the stud engaging member may rely solely upon staples or nails for securement to the stud, thus omitting the resilient stud engaging clip.

36 Claims, 10 Drawing Sheets

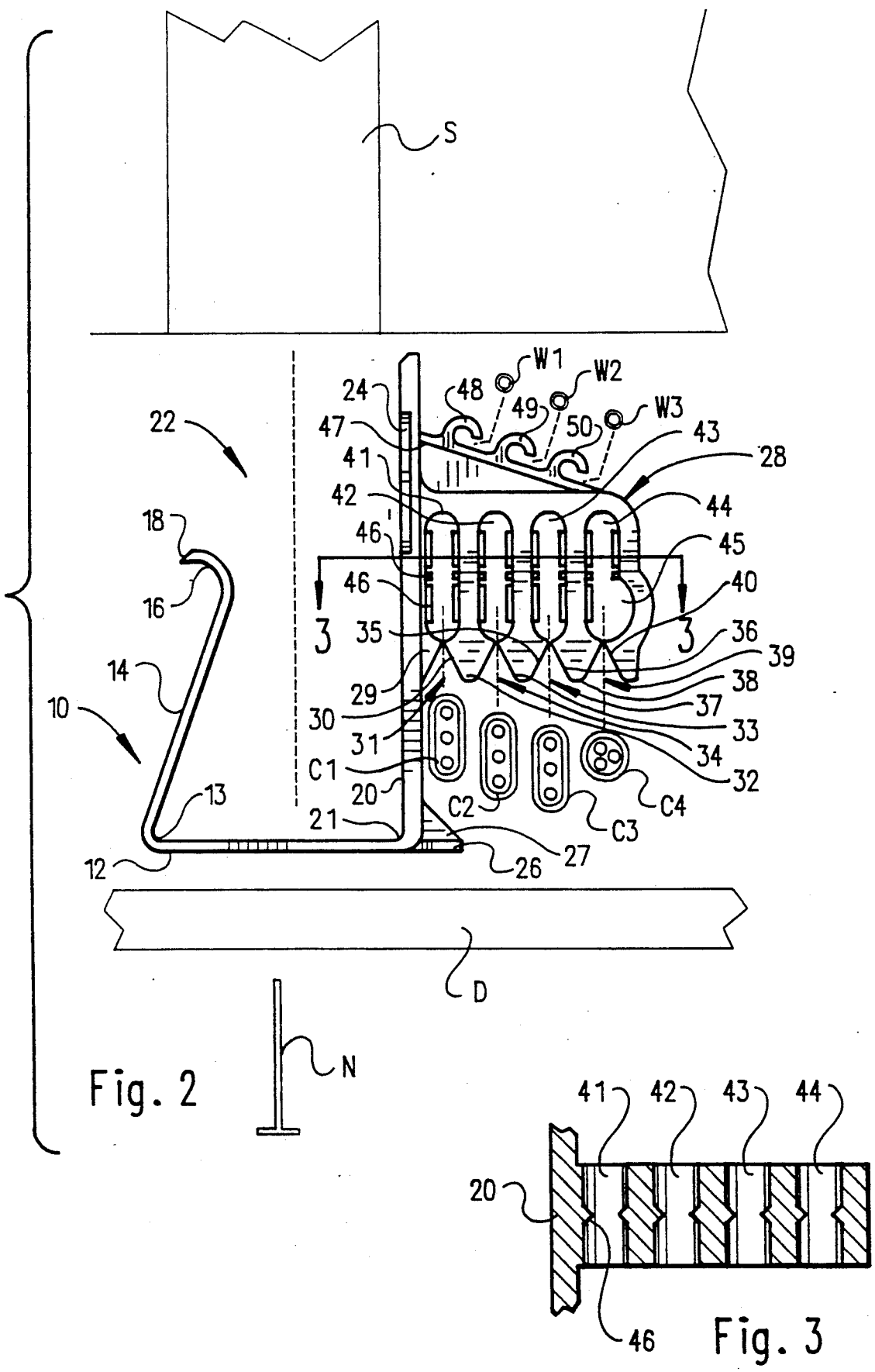

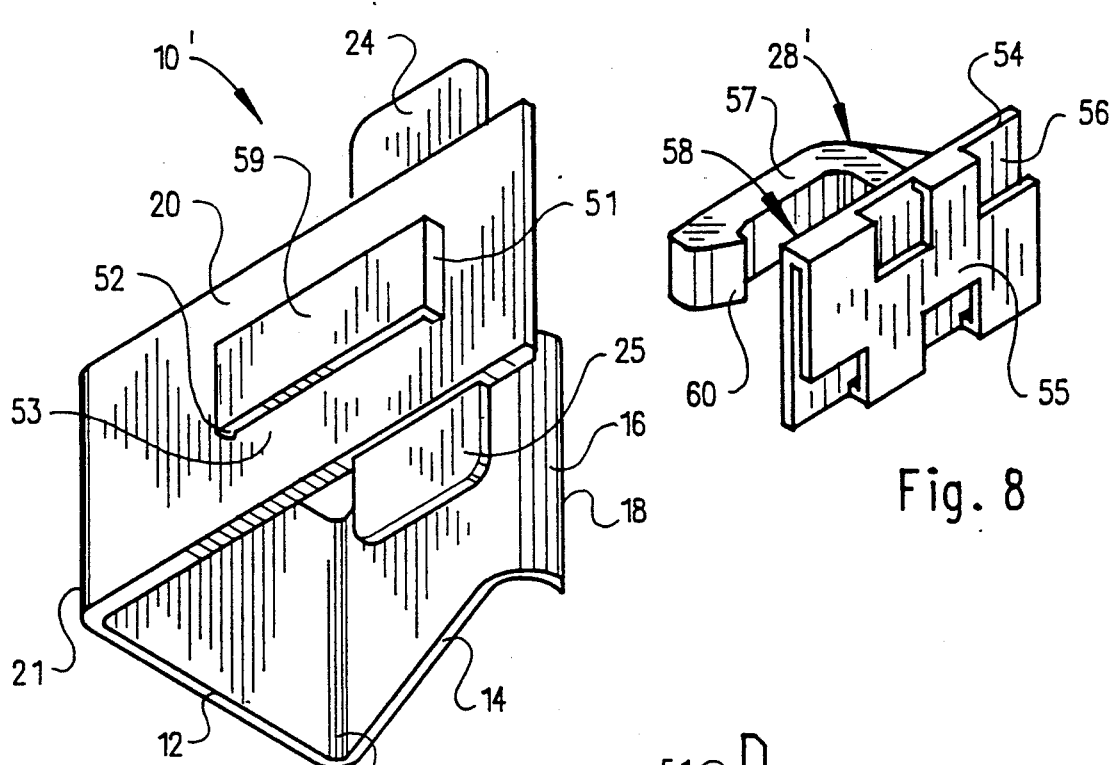
Fig. 7
Fig. 8
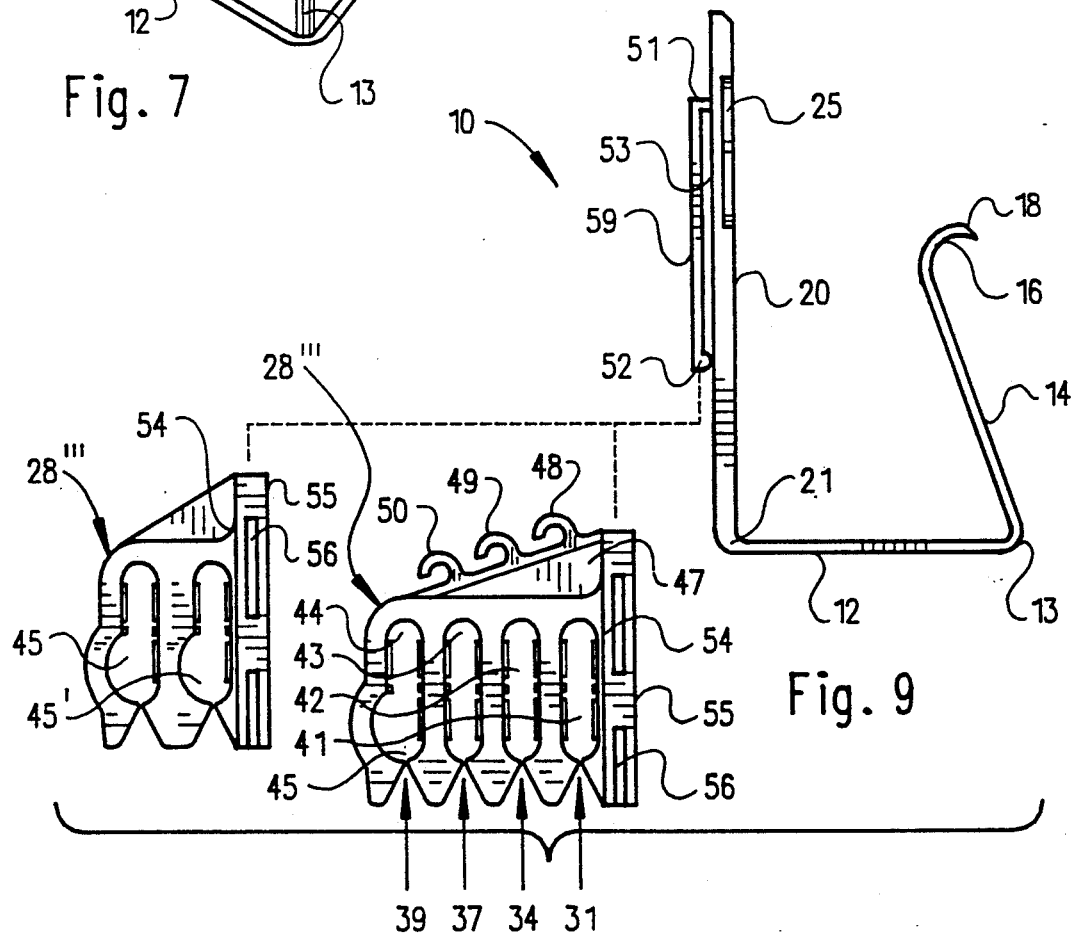
Fig. 9

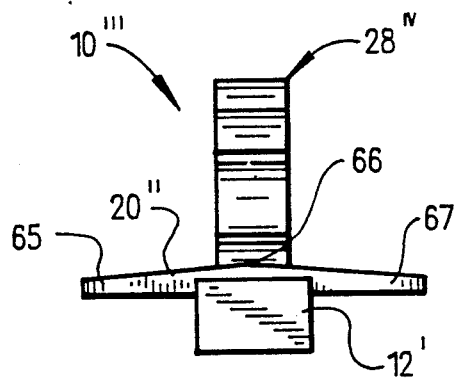
Fig. 16
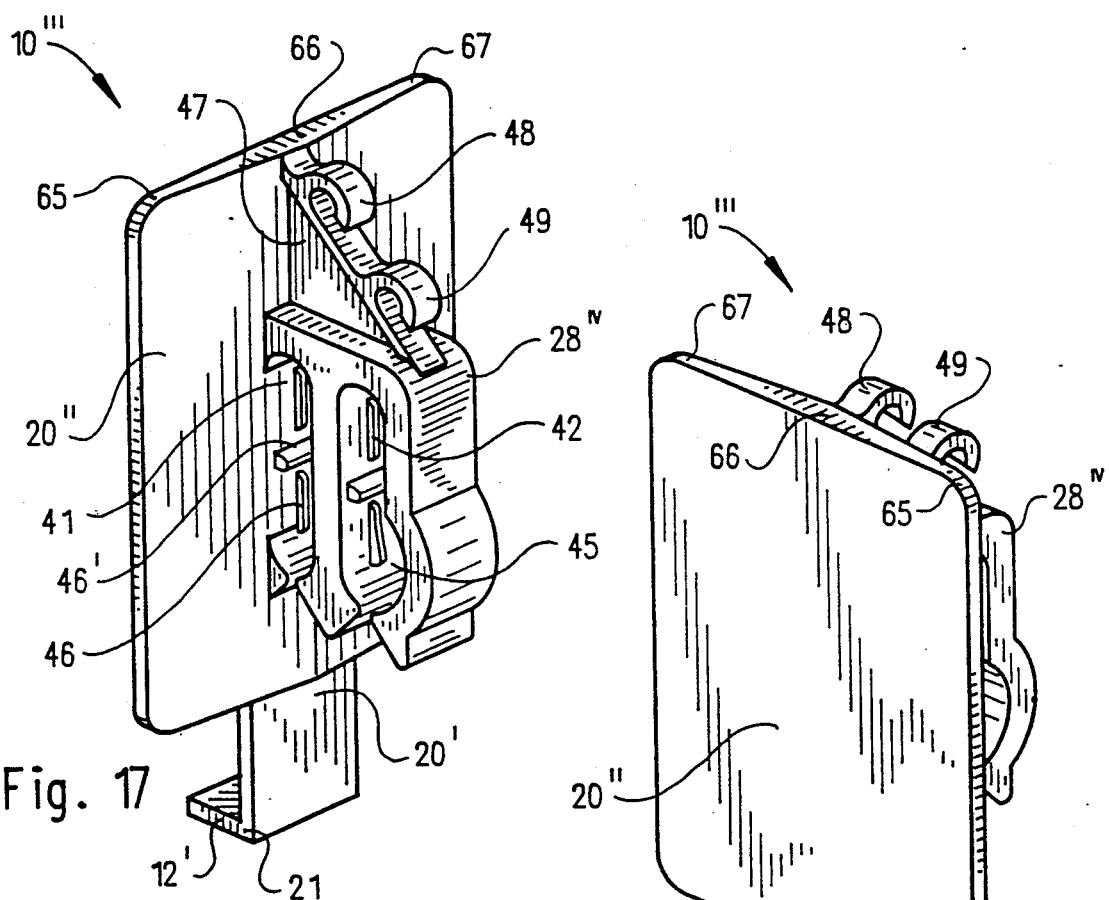
Fig. 17
Fig. 18

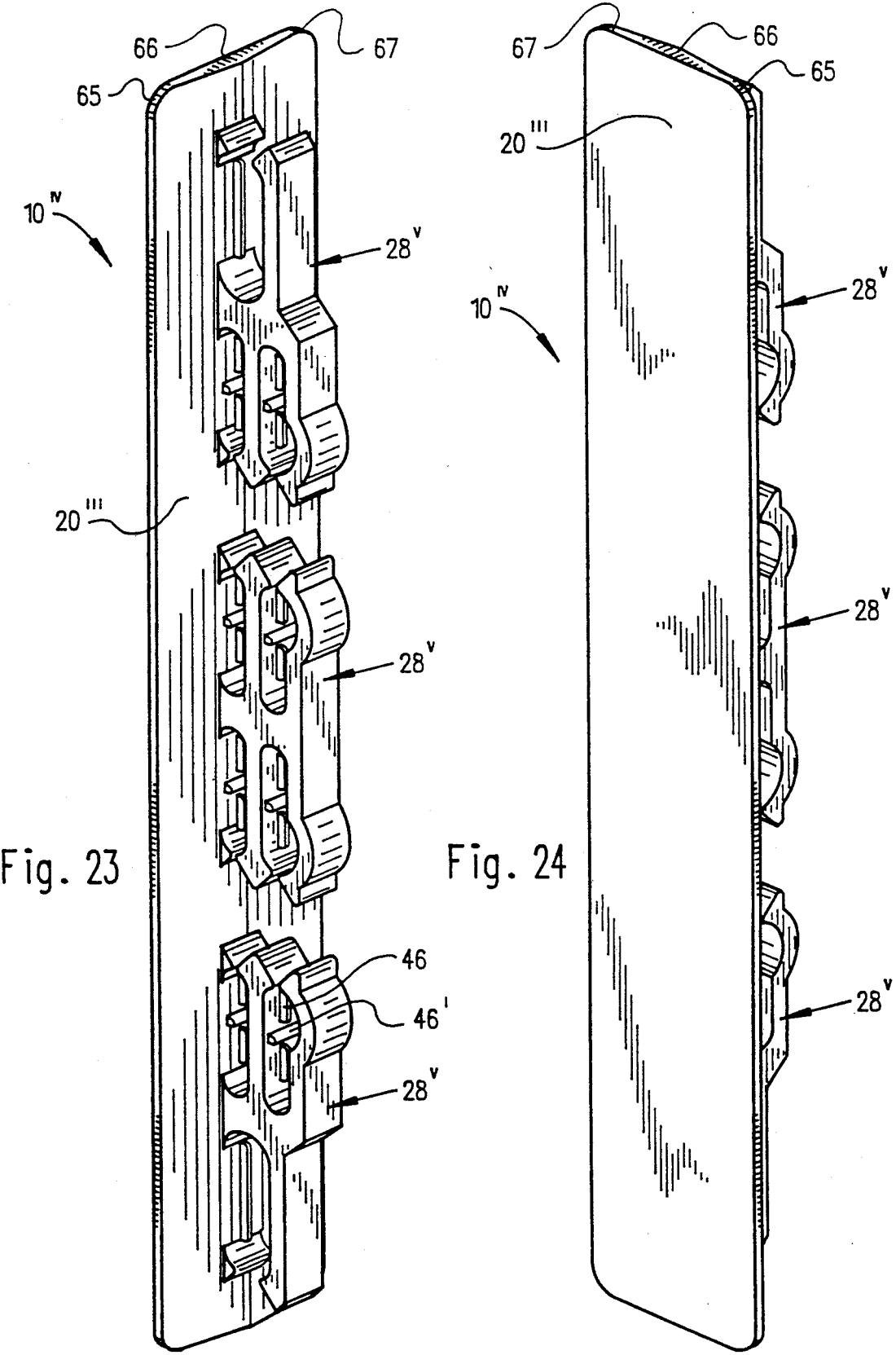

STUD ENGAGING ELECTRICAL WIRING CLIP

RELATED APPLICATIONS

This application is a continuation-in-part of application Ser. Nos. 07/722,245, filed Jun. 27, 1991, 07/739,392, filed Aug. 1, 1991, 07/739,394, filed Aug. 1, 1991, and 07/739,395, filed Aug. 1, 1991.

BACKGROUND OF THE INVENTION

1. Field of the Invention

The present invention relates to electrical wiring clips, and more particularly pertains to an electrical wiring clip which allows electrical cables, wires and boxes to be inexpensively and rapidly secured to framing studs, such as conventional 2"×4" or 2"×6" framing studs, during new or remodel construction.

2. Description of the Prior Art

The typical method of securing electrical wiring to framing studs has heretofore involved stapling the wires or cables, for example the type known as ROMEX, directly to the studs. In order to save time, wires were bundled beneath a single staple. Recent changes to the National Electrical Code have precluded this previous practice, based upon a ,requirement of wire spacing to ensure adequate cooling to minimize fire danger. The recent code changes require that, no more than three cables are to be secured to a 2"×4" stud, the cables must not be closer than 1.25" to the nearest outside surface of the stud. More and more states are prohibiting the uses of metal staples to secure cables to the stud, and requiring that an electrically insulating means of securing the cables to the stud be utilized. Relevant portions of the National Electric Code are set forth below:

Art. 336-15 Supports

Non-metallic sheathed cable (Romex) shall be secured by staples, straps, or similar fittings so designed and installed as not to damage the cable. Cable shall be secured in place at intervals not exceeding 4½ feet (1.37 m) and within 12" (305 mm) from every cabinet, box or fitting.

Art. 300-4 (d)

Cables and raceways parallel to framing members. In both exposed and concealed locations, where a cable or raceway-type wiring method is installed parallel to framing members, such as joists, rafters, or studs, the cable or raceway shall be installed and supported so that the nearest outside surface of the cable or raceway is not less than 1¼" inches (31.8 mm) from the nearest edge of the framing member where nails or screws are likely to penetrate.

Thus, to utilize the conventional stapling method, a staple is used at each securement point for each wire or cable element, and the staple and wires must be spaced in conformance with the new requirements of the National Electric Code. The securement of each wire or cable utilizing individual staples is a tedious and time consuming process, slowing down the electrician and consequently resulting in greater costs.

SUMMARY OF THE INVENTION

Accordingly, it is an object of the present invention to provide a new and improved electrical wiring clip which allows one or several electrical wires or cables to be rapidly and inexpensively secured to a framing stud, in conformance with the spacing and securing requirements of the National Electric Code.

It is a further object of the present invention to provide a new and improved electrical wiring clip which is of a durable and reliable construction.

Yet another object of the present invention is to provide a new and improved electrical wiring clip which allows electrical wires, cables and boxes to be rapidly secured to framing studs without the use of additional fasteners.

Even still another object of the present invention is to provide a new and improved electrical wiring clip which may be easily adapted for use with various different forms of electrical wires, cables and electrical boxes utilizing a plurality of different attachment members.

In order to achieve these and other objects of the invention, the present invention provides an improved electrical wiring clip which includes, in a first embodiment of the invention, a substantially U-shaped stud engaging clip formed from a resilient plastic or metal material and dimensioned for frictional engagement with a standard 2"×4" or 2"×6" framing stud. A wire engaging clip body is formed on a side wall of the stud engaging clip and includes a plurality of resilient clips which may be selectively dimensioned to secure flat ROMEX type cables, round cables, telephone lines, TV cable, or individual wires. Preferably, each wire engaging clip body includes a variety of differently dimensioned individual clip elements to allow convenient securement of various different conventional forms of wiring. The stud engaging clip may be stapled to the conventional 2"×4" or 2"×6" stud by a conventional manual or rechargeable staple gun to enhance securement. After the wiring is installed utilizing a plurality of the stud engaging clips, drywall is conventionally nailed to the studs, over the clips. According to a second embodiment of the invention, the stud engaging clip may include a resilient clip member dimensioned for cooperation with a plurality of separate wiring system attachments. The wiring system attachments include a variety of different wire engaging clip members for use with various different conventional wire forms and a variety of different electrical boxes. According to other embodiments of the invention, the stud engaging member may rely solely upon staples or nails for securement to the stud, thus omitting the resilient stud engaging clip.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 2 is a top plan view illustrating the manner of use of the stud engaging clip of FIG. 1.

FIG. 3 is a cross-sectional view taken along line 3—3 of FIG. 2.

FIG. 7 is a perspective view illustrating a stud engaging clip according to a second embodiment of the invention.

FIG. 8 is a perspective view illustrating an electrical cable securing clip attachment for use with the stud engaging clip of FIG. 7.

FIG. 9 is an exploded top plan view illustrating the alternative use of the stud engaging clip of FIG. 7 with two different wire and cable securing clip attachments.

FIG. 16 is a top plan view of the stud engaging electrical wire or cable securing member of FIG. 14.

FIG. 17 is a top front perspective view of the stud engaging electrical wire or cable securing member of FIG. 14.

FIG. 18 is a top rear perspective view of the stud engaging electrical wire or cable securing member of FIG. 14.

FIG. 23 is a top front perspective view of the stud engaging electrical wire or cable securing member of FIG. 19.

FIG. 24 is a top rear perspective view of the stud engaging electrical wire or cable securing member of FIG. 19.

DETAILED DESCRIPTION OF THE PREFERRED EMBODIMENTS

Figure 1:
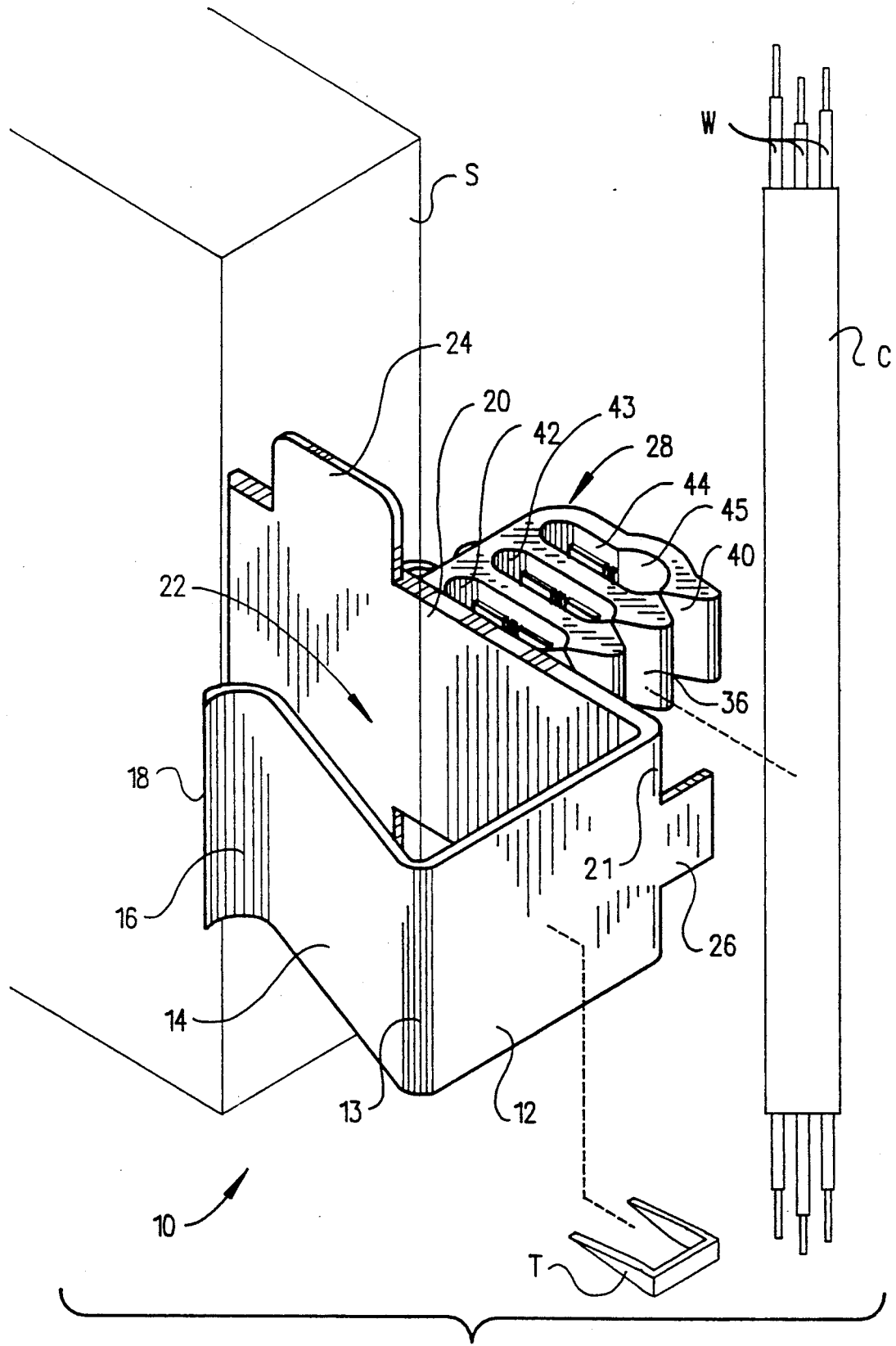
FIG. 1 is an exploded perspective view illustrating the manner of securing electrical wiring to a framing stud utilizing a stud engaging clip according to a first embodiment of the invention.
Figure 4:
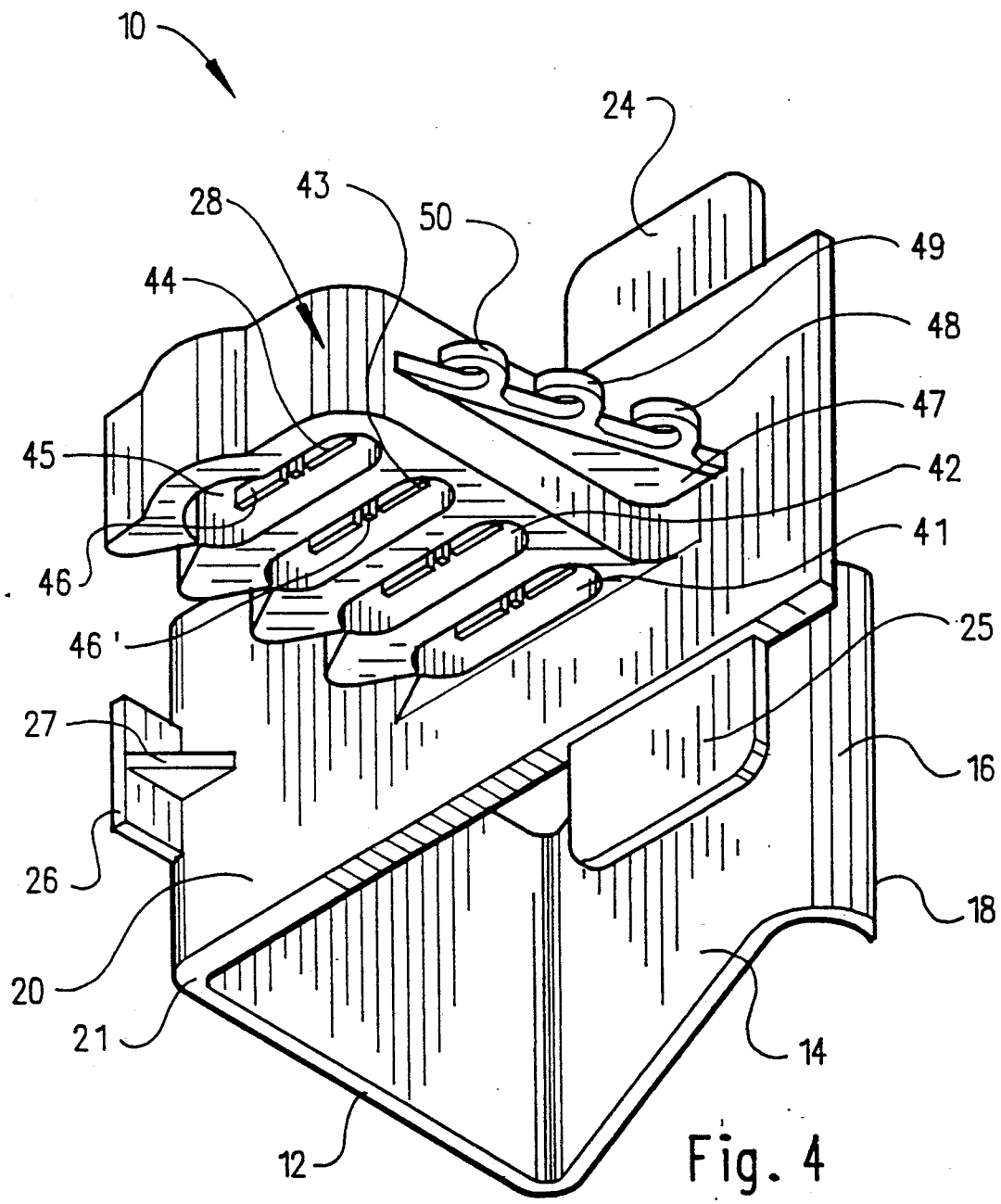
FIG. 4 is a bottom rear perspective view further illustrating the stud engaging clip according to the first embodiment of the invention.

Referring now to the drawings, wherein like reference numerals designate corresponding structure throughout the views, and referring in particular to FIGS. 1 through 6, an improved electrical wiring clip 10 according to a first preferred embodiment of the invention includes a substantially planar rectangular front wall 12 connected by a radiused bend 13 with a substantially planar inwardly inclined side wall 14 which terminates in an outwardly flaring radiused bend portion 16 forming a terminal lip 18. An opposite, substantially rectangular, planar side wall 20 is connected with the front wall 12 by a radiused right angle bend 21. The side wall 20 is preferably thicker and thus more rigid than the front wall 12 and inclined side wall 14 to provide a rigid mounting platform for a wire engaging clip body 28. The distance between the front wall 12 and the clip body 28, measured from the bend 21, is predetermined to meet the set back spacing requirements of the National Electric Code. Staple tabs 24 and 25 extend in aligned relation from top and bottom edges of the side wall 20, as can be appreciated from FIG. 5. The substantially U-shaped clip 10 has an open channel portion 22 dimensioned for close fitting frictional engagement with a conventional 2"×4" or 2"×6" stud S. In this connection, it should be noted that the outwardly flaring terminal lip 18 facilitates engagement of the clip 10 with the stud S. Staples, nails or tacks, for example the staple illustrated at T, may be driven through the front wall 12 of the clip 10, and also through the tabs 24 and 25 to enhance securement of the clip 10 on the stud S. The front wall 12 and tabs 24 and 25 are each preferably about 0.040" thick such that a stable can be driven through these portions and into a wooden framing member by a hand-held manual or rechargeable stable gun. It should be noted that this is an optional measure, as the frictional engagement of the clip 10 is sufficient to retain the clip 10 at the desired location along the stud S, particularly after the sheet rock or dry wall D is secured to the stud S using a conventional nail N, as shown in FIG. 2. The inclined side wall 14 in conjunction with the radiused bend portion 16 and terminal lip 18 provide a frictional gripping force which secures the clip 10 to a framing member prior to stapling with a staple gun. This construction allows one-handed installation of the clip 10 on the framing member (stud).

A wire engaging clip body 28 is integrally formed with and projects outwardly from the side wall 20 of the stud engaging clip 10. As can best be appreciated from FIG. 2, the wire engaging clip 28 includes a plurality of pairs of inwardly converging inclined guide ramp surfaces 29 and 30, 32 and 33, 35 and 36, 39 and 40. These respective pairs of inwardly converging, substantially planar, inclined ramp surfaces form V-shaped guides 31, 34, 37 and 39 which serve to direct respective cables C1, C2, C3 and C4 into respective receiver slots 41, 42, 43, 44 and 45. The cable slots accept cable sizes from as small as TV or computer cable up to #4-3 conductor SER cable. The guide ramp surfaces allow cables to easily slip into the receiver slots, where they are locked in place. These receiver slots allow a total of eight cables to be secured by a single clip 10. It should be noted that the slot 44 merging into the rounded slot portion 45 is adapted to secure either a flat ROMEX type cable or a round cable, as desired. The slot 45 is dimensioned to accommodate a 3 conductor with ground cable, such as #4/3 cable. As can be appreciated from FIGS. 2 and 3, each of the slots 41, 42, 43 and 44 include V-shaped medial projections 46 for purposes of a tight fitting snap-type frictional engagement with a ROMEX type cable inserted therein. The medial projections 46 may be formed in other than a V-shaped configuration within the scope of the invention. Each of the slots 41, 42, 43, 44, 45 have two opposing side walls upon which two medial projections 46 are formed. The pair of medial projections 46 on each side wall are separated by a stop member 46', which serves to space apart a pair of cables, such as ROMEX cables, disposed within a slot. The medial projections 46 and stop members 46', on opposing side walls of each slot are juxtaposed. Thus, two cables may be secured within each of the slots, for a total securement of eight cables by a single clip 10. The flexible webs separating the cable slots, in conjunction with the medial projections 46 serve to secure and prevent cable slippage through the cable slots, while maintaining National Electric Code spacing requirements to allow adequate air flow around the cables and prevent heat transfer between cables. In order to provide securement for smaller diameter single strand insulated wires, telephone lines, control cables, etc. W1, W2 and W3, a plurality of substantially circular, open loop clips 48, 49 and 50 are spaced substantially evenly along an inclined flange 47. The flange 47 provides extra strength and support to the entire clip body 28, and thus also to each wire and cable secured therein. The clips 48, 49 and 50 are adapted to accept smaller cables than those received by slots 41, 42, 43, 44, and 45, such as bell wire, phone wire and also security and sound system cable. The thickness of the clip body along the edge joining the flange 47 provides the gripping strength of the clip body.

As can now be appreciated, the stud engaging clip 10 allows a wide variety of conventional types of electrical wires and cables to be rapidly secured to a conventional stud S.

To facilitate proper alignment of the clip 10 and associated wiring with a sheet of sheet rock or dry wall D forming the outer surface of a wall, a laterally projecting rectangular tab 26 is formed on the front wall 12 of the clip 10 and reinforced by a triangular flange 27. The tab 26 forms a reinforced drywall pressure point that provides pressure against the flat side of a framing member after the drywall is applied. This limits movement of the clip 10 away from the framing member stud. The wire securing clip body 28 is spaced rearwardly along the wall 20 a sufficient distance from the front wall 12 to prevent accidental engagement of a conventional length dry wall nail N with wiring secured within the clip body 28. Additionally, the slots 41, 42, 43 and 44 are sufficiently spaced within the clip body 28 to comply with the requirements of the National Electrical Code.

Figure 5:
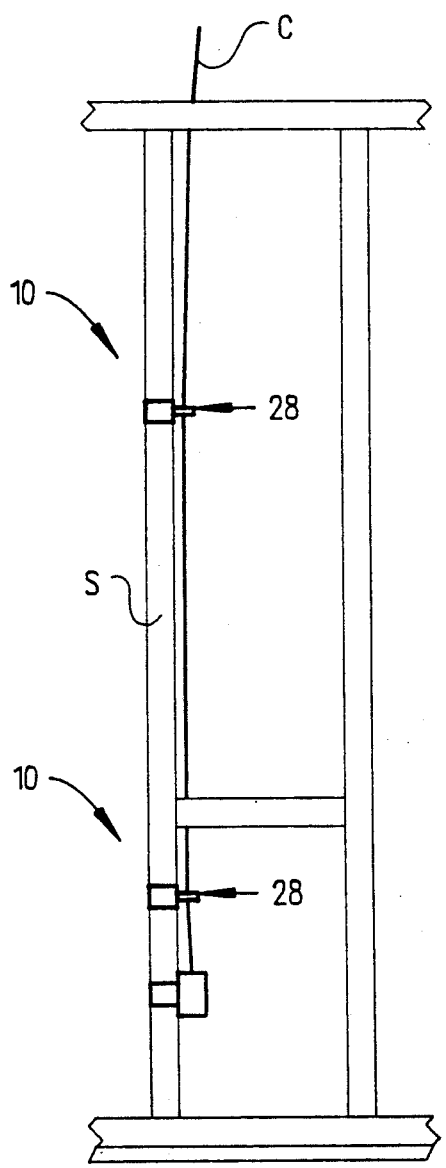
FIG. 5 is a front elevational view illustrating an electrical cable, secured to a framing stud by a plurality of stud engaging clips of the type shown in FIGS. 1 and 2.
Figure 6:
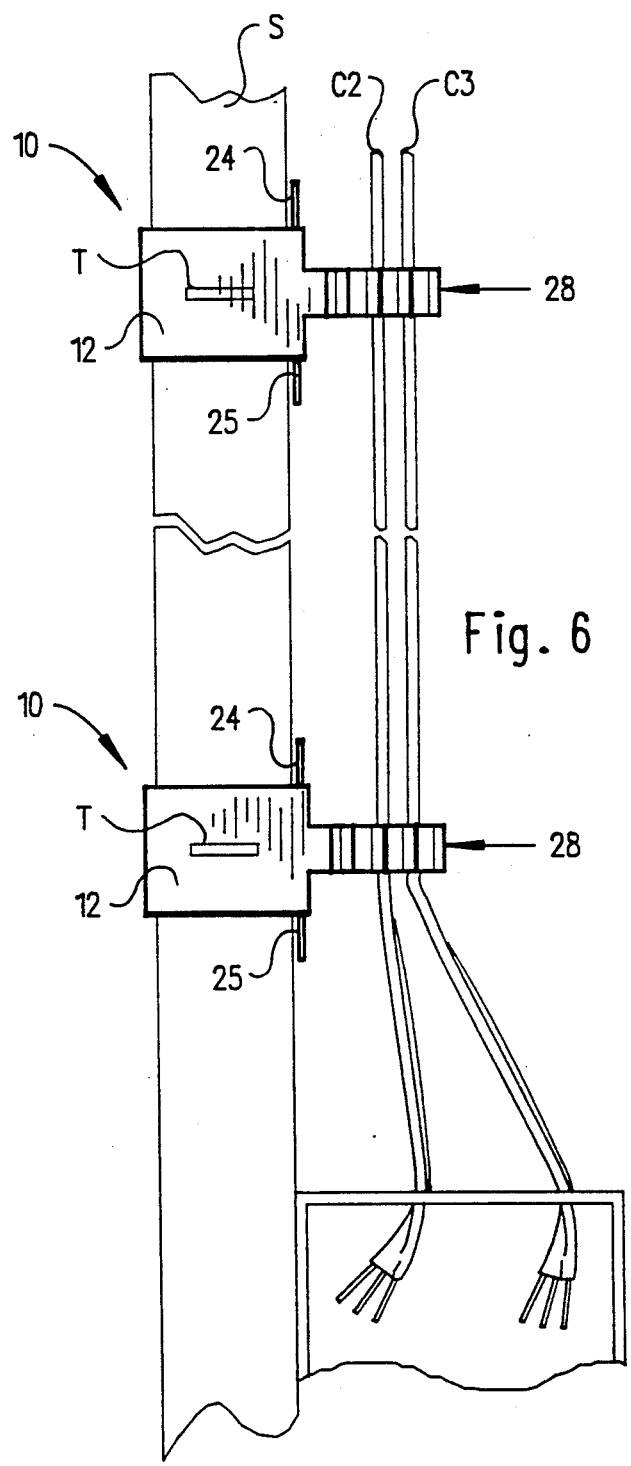
FIG. 6 is a front elevational enlarged detail view, partially cut-away, further illustrating the stud engaging clips shown in FIG. 5.

FIGS. 5 and 6 illustrate typical uses of the clips 10 to replace the conventional method of stapling ROMEX wiring directly to wooden studs. The clips of the present invention allow pre-securing of cables to the studs at the box-out stage.

A stud engaging clip 10', according to a second embodiment of the invention is illustrated in FIGS. 7 and 9. The clip 10', is substantially similar to the clip 10 illustrated in FIGS. 1 through 6, with the salient distinction that the wire engaging clip body 28 of the clip 10 is replaced with a resilient leaf spring type clip 59 for releasable engagement with a selected one of a plurality of different electrical clip and box attachments. The resilient leaf type clip 59 is secured by a short transverse wall 51 to the side wall 20. An opposite free end of the clip 59 terminates in a small-radiused or alternatively V-shaped rib 52, which abuts the wall 20 in an equilibrium position. The rib 52 serves to lock the selected electrical clip or box attachment in an installed position on the clip 10'. The remainder of the clip 59 is separated from the outer side wall 20 by a slight spacing 53. The length of the wall 51 is selected to determine the spacing 53 in conformance with the dimensions of the clip receiving portion of the selected electrical clip or box attachment. Preferably the dimensions of the clip 59 and leg 51 will be standardized in conformance with the dimensions of the clip receiving portions molded integrally with the various attachments to enable interchangeability of parts.

A selectively detachable wire securing clip body 28', shown in FIG. 8, includes a base plate 54 and an outer plate 55 forming a slot 56 therebetween. The slot 56 is dimensioned for insertion of the clip body 59, for purposes of releasably securing the wire engaging clip body 28' to the stud engaging clip 10' shown in FIGS. 6 and 8, by merely sliding the receiver structure 54, 55, 56 onto the clip 59. The wire engaging clip 28' includes a somewhat resilient arm 57 forming a slot 58 between the arm 57 and the base plate 54. An inclined ramp surface 60 serves to direct ROMEX type electrical cable into the slot 58. The slot 58 is preferably dimensioned to grip #8 through #4 cable. It is contemplated that any device currently used in the electrical trade can be formed with a similar suitable receiver structure 54, 55, 56 for use with the clip 10'.

In FIG. 9, two alternative releasably securable wire engaging clip bodies 28'' and 28''' are illustrated for use in connection with the clip 10'. Each of the wire engaging clip bodies 28' and 28''' include a base plate 54 and an outer plate 55 forming a slot 56 dimensioned for insertion of the clip member 59 for the purpose of releasable securement to the stud engaging clip 10'. The wire engaging clip body 28'' includes a pair of arcuate slots 45 and 45, such that two round electrical cables or wires may be received therein. The wire engaging clip body 28''' is configured substantially similar to the integral wire engaging clip body 28 illustrated in FIG. 2. A user may select one of the interchangeable clip bodies 28'' or 28''' having identical integrally molded receiver portions 54, 55, 56, in accordance with the number of cables to be secured.

Figure 10:
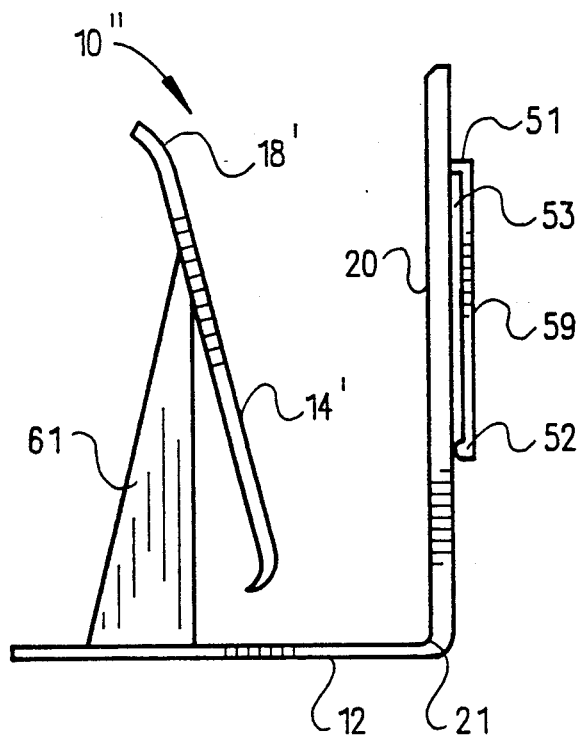
FIG. 10 is a top plan view illustrating a stud engaging clip according to a third embodiment of the invention.

FIG. 10 illustrates a second alternative embodiment of a stud engaging clip 10'' according to the present invention. The clip 10'' includes a rectangular front wall 12 connected by a right angle radiused bend 21 with a substantially rectangular side wall 20, to which a resilient leaf type clip 59 is secured. The opposite side wall 14' of the clip 10'' is secured to an inwardly inclined upstanding flange or leg 61. As depicted, the compound angles of the leg 61 and side wall 14' form an outwardly diverging, generally V-shaped channel, dimensioned for engagement with a conventional framing stud. The wall 14', terminal lip 18' and leg 61 of the clip 10'', and their relative angular orientations result in the application of more gripping pressure to the front wall 12', as compared with the clip 10, thus reducing the chance of any flex of the clip 10' occurring at this location.

Figure 11:
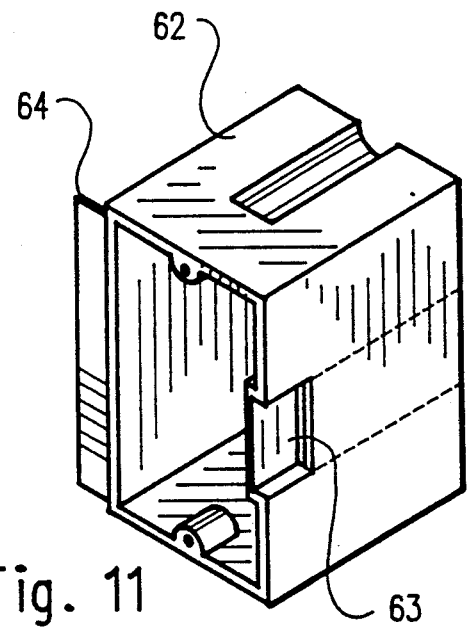
FIG. 11 is a perspective view of a single gang electrical box attachment for use with the stud engaging clips of FIGS. 7 and 10.
Figure 12:
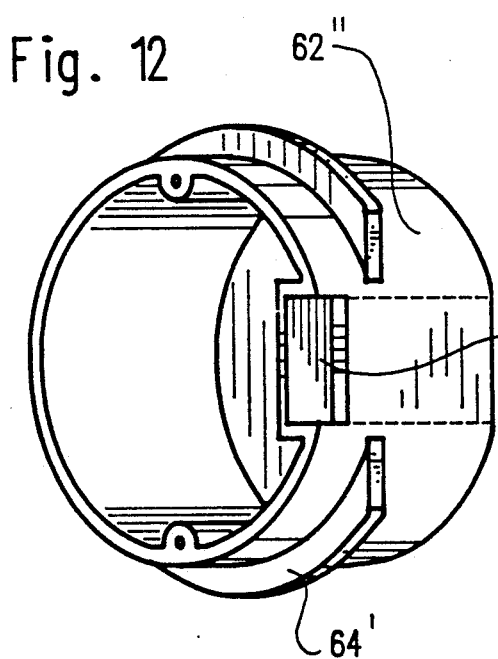
FIG. 12 is a perspective view of a ceiling electrical box attachment for use with the stud engaging clips of FIGS. 7 and 10.
Figure 13:
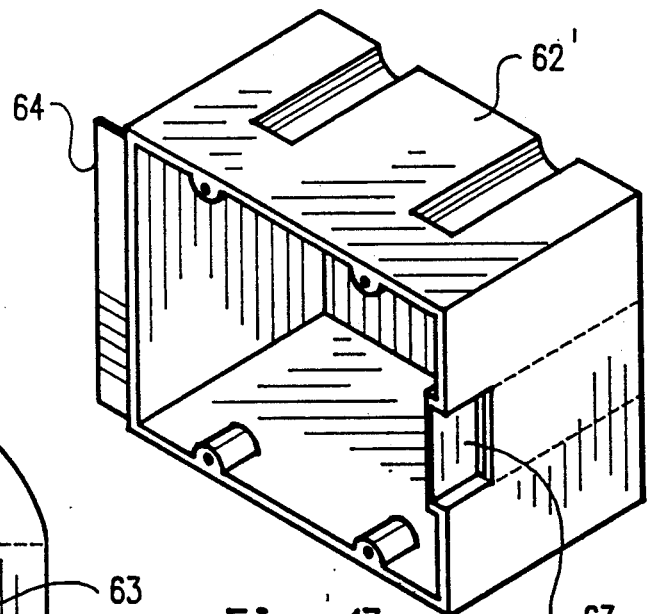
FIG. 13 is a perspective view of a double gang electrical box attachment for use with the stud engaging clips of FIGS. 7 and 10.
Figure 14:
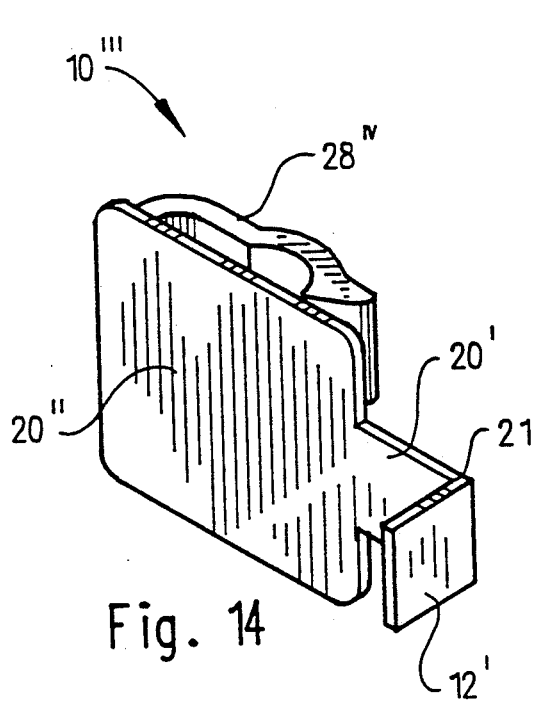
FIG. 14 is a perspective view of a nail or staple secured stud engaging member according to a fourth embodiment of the invention including a resilient clip body for holding a plurality of electrical cables or wires.
Figure 15:
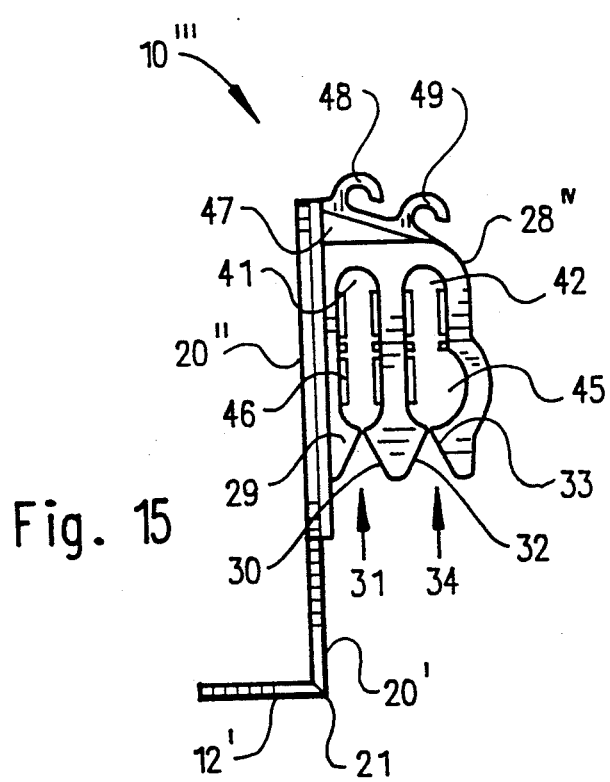
FIG. 15 is a side elevational view of the stud engaging electrical wire or cable securing member of FIG. 14.
Figure 19:
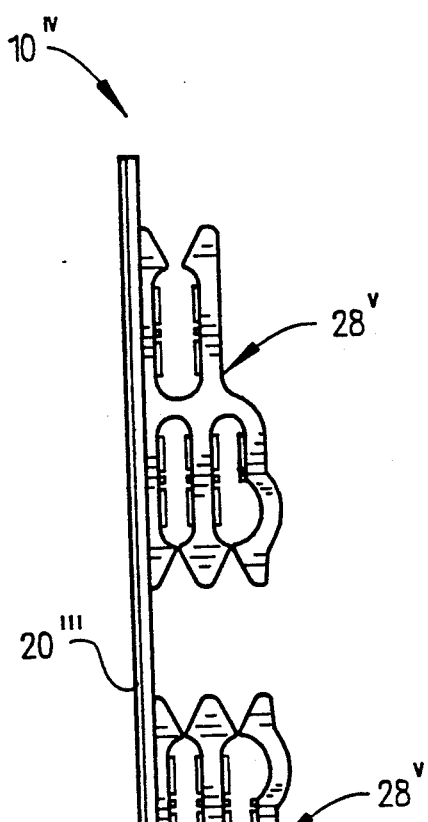
FIG. 19 side elevational view illustrating a nail or staple secured stud engaging member according to a fifth embodiment of the invention including a plurality of spaced clip bodies for holding a large number of electrical wires or cables.
Figure 20:
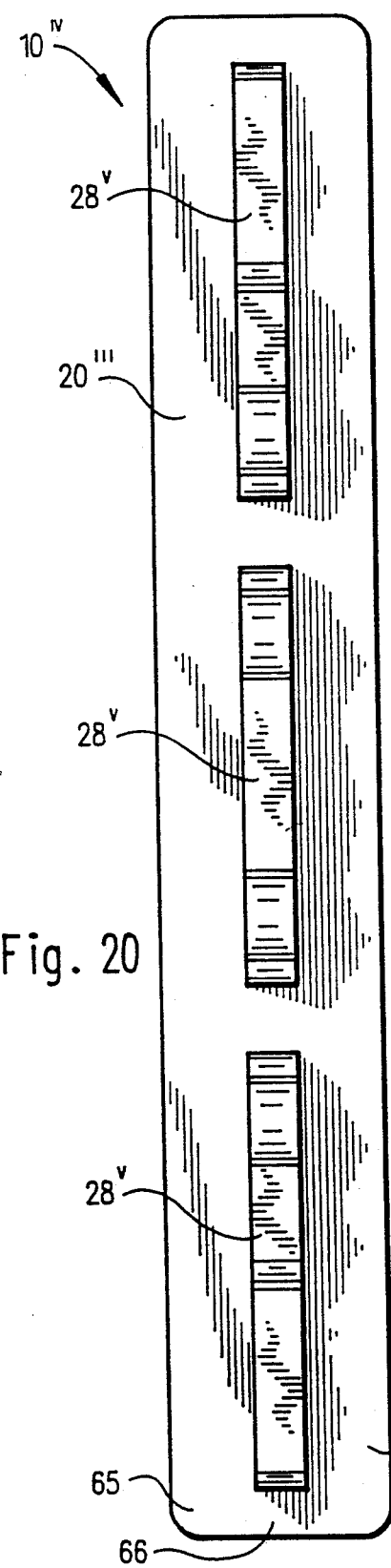
FIG. 20 is a front view of the stud engaging electrical wire or cable securing member of FIG. 19.
Figure 22:
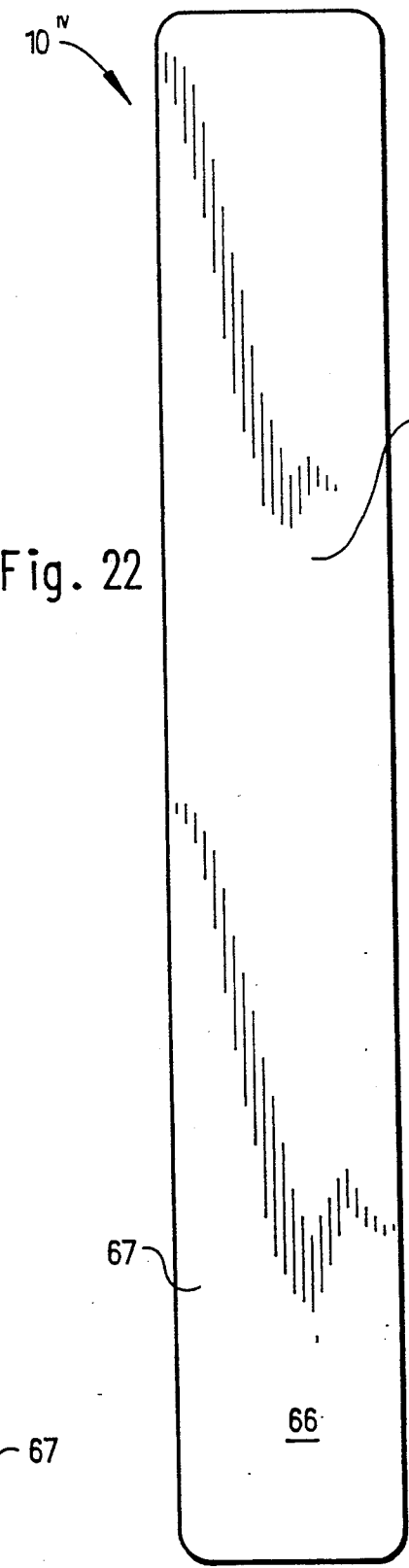
FIG. 22 is a rear view of the stud engaging electrical wire or cable securing member of FIG. 19.
Figure 21:
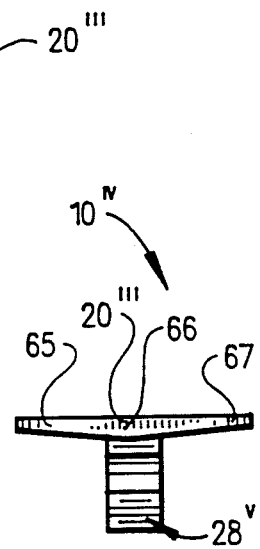
FIG. 21 is a top plan view of the stud engaging electrical wire or cable securing member of FIG. 19.

FIGS. 11, 12 and 13 illustrate three different types of electrical boxes which may be selectively and releasably secured to either the clip 10' illustrated in FIGS. 7 and 9 or the clip 10'' illustrated in FIG. 10. The box 62 illustrated in FIG. 11 is a single gang box, while the box 62, illustrated in FIG. 13 is a double gang electrical switch box. The circular box 62'' shown in FIG. 12 is a ceiling type box for use in wiring light fixtures and the like. Each of the boxes 62, 62' and 62'' includes a slot 63 dimensioned to receive the resilient leaf type clip 59 on the clips 10' and 10''. The boxes 62 and 62' include a narrow rectangular flange 64 for the purpose of setting the box at the proper spacing from installed dry wall or sheet rock. The circular ceiling box 62" includes a radial arcuate flange 64' for locating the box 62" at a correct spacing from a ceiling panel or adjacent sheet rock. The integrally molded receiver slots 63 and drywall stops 64 and 64' allow the boxes to be changed from single gang to 2, 3, 4 gang or 3/0 ceiling box, even after drywall installation. The stop flanges 64 and 64' serve to press the box against the flat of a stud after drywall is applied.

FIGS. 14 through 18 illustrate a stud engaging wire securing member 10''' according to the present invention. The stud engaging member 10''' includes a narrow width side wall portion 20' connected to a substantially wider rectangular base or side wall portion 20''. To facilitate nailing or stapling while maintaining maximum strength and rigidity, the side wall portion 20'' has a thickest central section 66 which tapers in thickness toward thinner edge portions 65 and 67. Thus, nails or staples may be more easily driven through edge portions 65 and 67 while the central portion 66 ensures a rigid mounting of the clip body $28^{IV}$. The front wall 12 of the stud engaging member 10'''is secured to the portion 20' by a right angle 21. The stud engaging member 10''' is adapted to be secured to a conventional framing stud by driving a staple through the side wall portion 20''. The front wall or tab 12 serves to properly position and align the stud engaging member 10''' on the framing stud. An additional nail or staple can be driven through the side wall portion 20'. The stud engaging member 10''' includes a wire engaging clip body $28^{IV}$. The clip 10''' is used in an analogous manner as the previously described clips 10, 10' and 10'', with the exception that a nail, staple or screw must be used for securement. The clip body $28^{IV}$ allows up to four cables to be secured in the slots 41, 42 and 45. The advantage of the clip 10''' is that it may be used in situations where only one side of a framing stud is accessible. The stud engaging member 10''' is adapted for securement to a wooden framing member (stud) by a 9/16'' staple. The dimensions of the stud engaging member 10''' are predetermined such that the cables held by clip body $28^{IV}$ will be automatically positioned centrally on the side of a 2''×4'' framing member, in accordance with National Electrical Code spacing requirements, when the tab 12 is positioned on the front of the framing member.

FIGS. 19 through 24 illustrate a stud engaging member $10^{IV}$ which includes an elongated substantially rectangular base plate member 20''' to which a plurality of wire engaging clip body members $28^V$ are secured. The stud engaging member $10^{IV}$ may be secured by staples, nails, screws or adhesively to a stud or other intended mounting surface. To facilitate nailing or stapling while maintaining maximum strength and rigidity, the side wall portion 20'' has a thickest central section 66 which tapers in thickness toward thinner edge portions 65 and 67. Thus, nails or staples may be more easily driven through edge portions 65 and 67 while the central portion 66 ensures a rigid mounting of the clip body $28^V$. The wire engaging clip body members $28^V$ are constructed and utilized in a manner substantially analogous to that described with reference to FIGS. 1 and 2 above. However, the clip body members $28^V$ each include at least two oppositely opening slots to allow insertion of electrical cables and/or wires from opposite directions. It should also be noted that the end most clip body members each possess an outwardly opening slot substantially wider than the other slots on the clip 10 for the purpose of securing a larger size cable therein. The stud engaging member $10^{IV}$ allows up to eighteen cables to be secured to a ceiling joist in an attic, to a support beam in a crawl space, or in a basement area. The stud engaging member $10^{IV}$ may be utilized to secure cables sizes #8 through #4, as well as all other cables used in residential wiring.

It is contemplated that the various components described above may be constructed from an injection molded or extruded plastic material, or from a sheet metal material, within the purview of the present invention. Preferred plastic materials include recycled polypropylene, polypropylene with CoCa3 and/or other additives, polyethylene, and polyvinyl chloride.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A clip for securing electrical cables and/or wires to a framing member, comprising:
   a front wall;
   a first inclined side wall obliquely connected to said front wall;
   a second side wall connected substantially perpendicularly to said front wall;
   said front wall, said first inclined side wall and said second side wall defining an open channel dimensioned to receive a framing member;
   said first inclined side wall being sufficiently resilient so as to provide a frictional clamping force for securing said clip to the framing member; and
   an electrical cable and wire engaging clip body formed on an outer surface of said second side wall, said clip body including a plurality of slots formed therein and dimensioned for insertion of electrical cables and/or wires.

2. The clip of claim 1, further comprising a tab extending laterally outwardly from said front wall at the intersection of said front wall with said second side wall, said tab dimensioned for abutment with an interior surface of a conventional sheet of drywall and effective to urge said second side wall adjacent a side of the framing member after drywall application.

3. The clip of claim 1, further comprising a pair of staple tabs extending from top and bottom edges of said second side wall.

4. The clip of claim 3, wherein said staple tabs possess a thickness less than said second side wall to facilitate stapling therethrough.

5. The clip of claim 1, further comprising a reinforcing flange extending along a back surface of said clip body and intersecting said second side wall.

6. The clip of claim 5, further comprising a plurality of open loop clips formed on a rear surface of said reinforcing flange.

7. The clip of claim 1, wherein at least one of said slots includes at least two pair of juxtaposed medial projections separated by a pair of juxtaposed stop members whereby two cables may be secured in spaced side by side relation therein.

8. The clip of claim 1, further comprising a pair of inwardly converging inclined guide ramp surfaces formed at an open end of each of said slots forming V-shaped guides for facilitating insertion of electrical cables into said slots.

9. The clip of claim 1, wherein each adjacent pair of slots are separated by a resilient web portion of said clip body for urging said clip body into clamping engagement with electrical cables and/or wires inserted within said slots.

10. A clip for securing electrical cables and/or wires to a framing member, comprising:

a substantially planar front wall;

a first inclined side wall obliquely connected to said front wall, said first inclined side wall possessing a free end terminating in an outwardly radiused terminal lip;

a second side wall connected substantially perpendicularly to said front wall; said second side wall possessing a thickness greater than said front wall and said first inclined side wall;

said front wall, said first inclined side wall and said second side wall defining an open channel dimensioned to receive a framing member;

said first inclined side wall being sufficiently resilient so as to provide a frictional clamping force for securing said clip to the framing member;

a tab extending laterally outwardly from said front wall at the intersection of said front wall with said second side wall, said tab dimensioned for abutment with an interior surface of a conventional sheet of drywall and effective to urge said second side wall adjacent a side of the framing member after drywall application;

a pair of staple tabs extending in aligned relation from top and bottom edges of said second side wall, said staple tabs having a thickness less than said second side wall to facilitate stapling therethrough;

an electrical cable and wire engaging clip body formed on an outer surface of said second side wall, said clip body including:

a triangular reinforcing flange extending along a back surface of said clip body and intersecting said second side wall;

a plurality of open loop clips formed on an inclined rear surface of said triangular reinforcing flange;

a plurality of slots formed in said clip body, said slots extending substantially parallel with said second side wall;

at least one of said slots including at least two pair of juxtaposed V-shaped medial projections separated by a pair of juxtaposed stop members whereby two cables may be secured in spaced side by side relation therein;

a pair of inwardly converging inclined guide ramp surfaces formed at an open end of each of said slots forming V-shaped guides for facilitating insertion of electrical cables into said slots;

each adjacent pair of slots separated by a resilient web portion of said clip body for urging said medial projections into clamping engagement with electrical cables inserted within said slots; and at least one of said slots dimensioned to hold a substantially flat cable and a substantially round cable in side by side relation therein.

11. A clip for securing electrical cables and/or wires to a framing member, comprising:

a front wall;

a first inclined side wall obliquely connected to said front wall;

a second side wall connected substantially perpendicularly to said front wall;

said front wall, said first inclined side wall and said second side wall defining an open channel dimensioned to receive a framing member;

said first inclined side wall being sufficiently resilient so as to provide a frictional clamping force for securing said clip to the framing member;

an attaching clip on an outer surface of said second side wall; and an attachment for use in electrical wiring including a receiver structure dimensioned for engagement with said attaching clip for securing said attachment to the framing member.

12. The clip of claim 11, further comprising a substantially triangular leg extending substantially perpendicularly rearwardly from an inner surface of said front wall, said leg possessing an inclined end portion secured to said first inclined sidewall such that said first inclined sidewall extends obliquely to said leg and is secured to said front wall only by said leg.

13. The clip of claim 11, further comprising a pair of staple tabs extending from top and bottom edges of said second side wall.

14. The clip of claim 13, wherein said staple tabs possess a thickness less than said second side wall to facilitate stapling therethrough.

15. The clip of claim 11, wherein said attachment comprises an electrical box.

16. The clip of claim 15, wherein said electrical box includes an integrally formed slot dimensioned for receiving said attaching clip.

17. The clip of claim 15, wherein said electrical box includes an outwardly extending flange disposed substantially opposite said integrally formed slot and dimensioned such that abutment of said flange with a drywall sheet after drywall installation urges said box against said second side wall.

18. The clip of claim 15, wherein said electrical box is circular and includes a radially outwardly extending flange.

19. The clip of claim 11, wherein said attachment includes a clip body possessing a plurality of slots formed therein and dimensioned for insertion of electrical cables and/or wires.

20. The clip of claim 19, wherein at least one of said slots includes at least two pair of juxtaposed medial projections separated by a pair of juxtaposed stop members whereby two cables may be secured in spaced side by side relation therein.

21. The clip of claim 19, further comprising a pair of inwardly converging inclined guide ramp surfaces formed at an open end of each of said slots forming V-shaped guides for facilitating insertion of electrical cables into said slots.

22. The clip of claim 19, wherein each adjacent pair of slots are separated by a resilient web portion of said clip body for urging said clip body into clamping engagement with electrical cables and/or wires inserted within said slots.

23. A clip for securing electrical cables and/or wires to a framing member, comprising:

a substantially planar front wall;

a first inclined side wall obliquely connected to said front wall, said first inclined side wall possessing a free end terminating in an outwardly radiused terminal lip;

a second side wall connected substantially perpendicularly to said front wall; said second side wall possessing a thickness greater than said front wall and said first inclined side wall;

said front wall, said first inclined side wall and said second side wall defining an open channel dimensioned to receive a framing member;

said first inclined side wall being sufficiently resilient so as to provide a frictional clamping force for securing said clip to the framing member;

a pair of staple tabs extending in aligned relation from top and bottom edges of said second side wall, said staple tabs having a thickness less than said second side wall to facilitate stapling therethrough;

a resilient leaf spring type attaching clip formed on an outer surface of said second side wall, said attaching clip possessing a free end terminating in a locking projection biased into abutment with said second side wall;

an electrical cable and wire engaging clip body possessing a receiver slot dimensioned for engagement with said attaching clip for securing said clip body to a framing member, said clip body including:

a triangular reinforcing flange extending along a back surface of said clip body and intersecting said second side wall;

a plurality of open loop clips formed on an inclined rear surface of said triangular reinforcing flange;

a plurality of slots formed in said clip body, said slots extending substantially parallel with said second side wall;

at least one of said slots including at least two pair of juxtaposed V-shaped medial projections separated by a pair of juxtaposed stop members whereby two cables may be secured in spaced side by side relation therein;

a pair of inwardly converging inclined guide ramp surfaces formed at an open end of each of said slots forming V-shaped guides for facilitating insertion of electrical cables into said slots;

each adjacent pair of slots separated by a resilient web portion of said clip body for urging said medial projections into clamping engagement with electrical cables inserted within said slots; and at least one of said slots dimensioned to hold a substantially flat cable and a substantially round cable in side by side relation therein.

24. A clip for securing electrical cables and/or wires to a framing member, comprising:

a base;

A locating tab secured substantially perpendicularly to said base for abutment with a front surface of a framing member; and an electrical cable and/or wire engaging clip body formed on an outer surface of said base, said clip including a plurality of slots formed therein for insertion of electrical cables and/or wires.

25. The clip of claim 24, further comprising a reinforcing flange extending along a back surface of said clip body and intersecting said base.

26. The clip of claim 25, further comprising a plurality of open loop clips formed on a rear surface of said reinforcing flange.

27. The clip of claim 24, wherein at least one of said slots includes at least two pair of juxtaposed medial projections for clamping engagement with an electrical wire or cable.

28. The clip of claim 27, wherein said medial projections are separated by a pair of juxtaposed stop members whereby two cables may be secured in spaced side by side relation therein.

29. The clip of claim 24, further comprising a pair of inwardly converging inclined guide ramp surfaces formed at an open end of each of said slots forming V-shaped guides for facilitating insertion of electrical cables into said slots.

30. The clip of claim 24, wherein each adjacent pair of slots are separated by a resilient web portion of said clip body for urging said clip body into clamping engagement with electrical cables and/or wires inserted within said slots.

31. The clip of claim 24, wherein at least one of said slots is dimensioned to hold a substantially flat cable and a substantially round cable in side by side relation therein.

32. The clip of claim 24, wherein said base is elongated and a plurality of said clip bodies are spaced along said base for securing a relatively large number of electrical cables and/or wires thereto.

33. The clip of claim 24, wherein said locating tab is spaced a predetermined distance from said clip body so as to position electrical cables and/or wires secured within said clip body rearwardly from a front surface of a framing member.

34. The clip of claim 24, wherein said locating tab is connected to a reduced width and thickness portion of said base.

35. The clip of claim 24, wherein said base possesses a thickest central portion tapering to reduced thickness edge portions to facilitate driving of a nail or staple through said edge portions and into a framing member to secure said clip to said framing member.

36. The clip of claim 24, wherein said clip body includes at least two oppositely opening slots so as to allow electrical wires and/or cables to be inserted into said clip body from opposite directions.

* * * * *